United States Patent [19]

Rabilloud et al.

[11] 3,968,085
[45] July 6, 1976

[54] POLYAMINE COMPOSITIONS USEFUL AS HARDENING AGENTS FOR EPOXY RESINS

[75] Inventors: Guy Rabilloud; Bernard Sillion, both of Grenoble, France

[73] Assignee: Institut Francais du Petrole, des Carburants et Lubrifiants, Rueil-Malmaison, France

[22] Filed: Aug. 29, 1974

[21] Appl. No.: 501,696

[30] Foreign Application Priority Data
Aug. 29, 1973 France .............................. 73.31311

[52] U.S. Cl. ........................ 260/75 N; 260/2 N; 260/2.5 N; 260/47 EN; 260/49; 260/59 R; 260/75 T; 260/76; 260/296 R; 260/471 R; 260/835; 260/836; 428/417; 526/29
[51] Int. Cl.[2] ........................................... C08 17/14
[58] Field of Search ................ 260/75 N, 75 T, 76, 260/471 R, 296 R; 252/182

[56] References Cited
UNITED STATES PATENTS

| | | |
|---|---|---|
| 3,060,221 | 10/1962 | Thomas .......................... 260/471 R |
| 3,128,301 | 4/1964 | Larsen et al. .................... 260/471 R |
| 3,329,656 | 7/1967 | Tate et al. ..................... 260/471 R X |
| 3,817,940 | 6/1974 | Blahak ......................... 260/471 R X |

*Primary Examiner*—Murray Tillman
*Assistant Examiner*—T. Pertilla
*Attorney, Agent, or Firm*—Millen, Raptes & White

[57] ABSTRACT

The invention concerns new aromatic polyamine compositions useful as hardening agents containing a major proportion of polyamines of the formula:

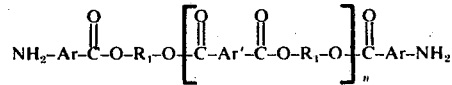

in which Ar and Ar' are divalent aromatic radicals having from 1 to 6 rings, $R_1$ is a divalent hydrocarbon radical or a radical $(R_4\text{-O})_m R_4$, $R_4$ being an alkylene and $m$ an integer from 1 to 100.

13 Claims, No Drawings

POLYAMINE COMPOSITIONS USEFUL AS HARDENING AGENTS FOR EPOXY RESINS

This invention concerns new aromatic polyamine compositions, their manufacture and uses, particularly as cross-linking agents for epoxy resins. It also concerns resinous compositions obtained by hardening epoxy resins by means of these new compositions.

It is known that the compounds which contain at least two epoxy groups per molecule may be converted to infusible resins by means of cross-linking agents such as aromatic diamines. Such resins withstand, under continuous operating conditions, temperatures from 100° to 150°C. One of the advantages of the diamines, such for example, as metaphenylenediamine, di-(4-amino phenyl) methane or di-(4-amino phenyl) sulfone, is to partially react with epoxy resins at temperatures from 60° to 150°C, to produce a composition called "B stage", which may be stored over 1 to 3 months at low temperature (0° to 25°C). This composition may subsequently be liquefied again by heating at a temperature from 100° to 200°C. It is then shaped and hardened by a thermal treatment of a few hours at 150°–200°C. With the diglycidylether of bis-phenol A, it is possible to manufacture molded, unfilled materials, having a bending temperature, under load, from 140° to 180°C, an ultimate tensile stress at break of 5 to 6 kg/mm² and an elongation at break of 3 to 6%.

The aromatic diamines suffer, however, from major inconveniences when they are used for manufacturing molded articles or laminates through the wet method, i.e. without solvent. As a matter of fact, the life time of the amine epoxy resin mixtures when stored in vessels does not exceed 1 to 2 hours at temperatures of 60° to 120°C which are required for lowering the viscosity to a convenient value for use. The hardening reaction is highly exothermic and the temperature of the mixture may spontaneously increase up to 260°C, thereby resulting in irregular stresses and, in the formation, of fragility zones in the materials. Moreover, an elongation at break lower than 5% is often insufficient for manufacturing composite materials since the resin contracts around the reinforcement fibers during the thermal treatment and it subsequently lacks of flexibility for transmitting the tensile and flexural stresses. Finally, the aromatic diamines must be used with care since they are generally very toxic to the skin and the respiratory tract.

One object of this invention is to provide new aromatic polyamine compositions which do not suffer from these disadvantages. They are generally solid materials or resins of high molecular weight, whose vapor pressure is very low. Apparently, they do not show any particular toxicity. They are miscible in any proportion with the epoxy resins available in the trade and they are soluble in all the usual solvents for these resins.

It is another object of this invention to prepare compositions from epoxy resins and these new polyamines whose life time, when stored in vessels, may reach 8 to 10 hours at 100°C. The preservation of the mixture at stage B is of several years between 0° and 5°C and from about 6 months to about 1 year at room temperature.

Another object of this invention concerns the use of these resinous compositions for practical applications such as the manufacture of varnishes, coatings, molded articles, cellular foams and composite materials withstanding, in continuous operation, i.e. over several thousands hours, high temperatures of for example, about 100° to 200°C. According to the nature of the polyamines, it is possible to manufacture easily molded, unfilled materials, whose bending temperature under load is from 60° to 200°C and whose lengthening at break is from 5 to 50%.

The polyamine compositions of the invention consist essentially of at least one polyamine of the general formula:

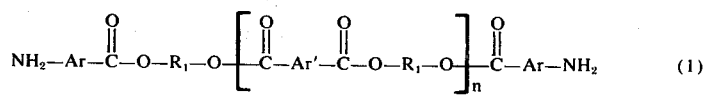

in which each of the radicals Ar and Ar' is a divalent homocyclic or heterocyclic aromatic radical, the two valences of which are one separate carbon atoms. Radicals Ar and Ar' may consist of one or more rings (for example from 2 to 6 rings) which are joined side by side or linked together, each ring containing preferably from 5 to 7 atoms, some of which may consist of oxygen, sulfur and/or nitrogen atoms.

When the radicals Ar and Ar' comprise several rings linked to one another, the linkage elements are for example, a single bond or one of the following atoms or divalent groups:

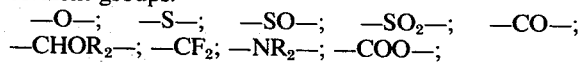

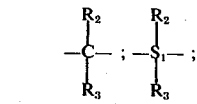

in which $R_2$ and $R_3$ are hydrogen atoms or monovalent hydrocarbon radical such, for example, as alkyl, cycloalkyl or aryl groups. In most cases, the radicals Ar and Ar' will contain one or two aromatic rings.

Each radical $R_1$ of the formula (1) is a divalent organic radical having at least two carbon atoms. More particularly, $R_1$ may be a staight or branched saturated aliphatic hydrocarbon radical, a saturated alicyclic, aliphatic-alicyclic or aryl-aliphatic hydrocarbon radical having from 2 to 24 carbon atoms or also a radical of the formula:

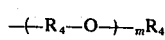

in which $R_4$ is a divalent saturated aliphatic radical having from 2 to 10 carbon atoms and m is an integer from 1 to 100.

n is a whole number of low value generally from 1 to 10, preferably from 1 to 6. As it will be apparent hereinafter, formula (1) is that of the essential component of the polyamine compositions of the invention. The latter m may also contain, according to the nature of the reactants used for their preparation, polyamines with branched oligoester chains.

We will describe hereinafter, methods for synthesizing the polyamines according to the invention. They may comprise two or three steps. Generally, the first step consists of reacting at least one aromatic dicarboxylic compound of the general formula:

$$R'CO - Ar' - COR' \qquad (2)$$

in which Ar' is a divalent aromatic radical as hereinabove defined and R' is a hydroxy group, a halogen atom (chlorine or bromine) or a lower alkoxy radical, such for example as, methoxy, ethoxy, propoxy, isopropoxy, butoxy and t-butoxy radicals, with an excess of at least one diol of the general formula:

$$HO - R_1 - OH \qquad (3)$$

in which $R_1$ is a divalent organic radical as hereabove defined so as to obtain, as reaction product, a composition consisting essentially of at least one oligoester having terminal hydroxy groups and complying with the general formula:

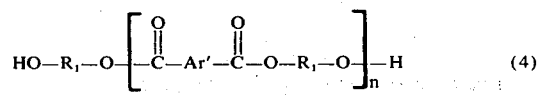

(4)

in which Ar', $R_1$ and $n$ are defined as above.

The diol excess may vary from 1.1 to 50 (preferably from 1.1 to 10) moles of diol per mole of dicarboxylic compound, so that the number $n$, which indicates the polycondensation degree of the oligoester chains, has a value from 1 to 10 and preferably from 1 to 6.

As mentioned above, it is within the scope of the invention, to produce branched oligoesters having, as an average, more than two hydroxy groups per molecule, by replacing a small amount of the reactants (2) and/or (3) by reactants having a functionality higher than 2 such for example as triols or tetrols, or still tri- or tetracarboxylic aromatic compounds.

As dicarboxylic aromatic compounds to be used in the first stage of the process, we can mention: o-phthalic acid, terephthalic acid, 3,3',(4,4'),(2,2') and (3,4')-dicarboxy biphenyles, 2,6,(2,4) and (3,5) dicarboxy pyridines, isophthalic acid, 1,3,(1,4),(1,5),(1,6), (2,6) and (2,7) dicarboxynaphthalenes, 4,4' and 3,3' dicarboxydiphenylethers, 3,3' and 4,4' dicarboxybenzophenones, 3,3' and 4,4' dicarboxy diphenylmethanes, their halides (preferably chlorides and bromides) and their lower alkyl esters, for example the methyl, ethyl, propyl, isopropyl n-butyl or t-butyl esters.

As examples of diols to be used according to the invention, we may mention ethyleneglycol, diethyleneglycol, triethyleneglycol, tetraethyleneglycol and polyethyleneglycols of a higher molecular weight, 1,2-propyleneglycol, 1,3-propyleneglycol, 2,2-dimethyl 1,3-propanediol (neopentylglycol), 2-methyl 2-propyl 1,3-propanediol, 1,3-butanediol, 1,4-butanediol, 1,5-pentanediol, 1,4-cyclohexanediol, 2,2-bis(4-hydroxycyclohexyl) propane, 1,4-dimethyl benzene, and as examples of polyols of a functionality higher than 2, the 1,2,4-butanetriol, 1,1,1-trimethylol ethane, 1,1,1-trimethylol propane, pentaerythritol, sorbitol and mannitol.

The selection of the reactants will be made more particularly with consideration of the following factors: easiness of use, moderate price, stability to heat under the conditions required for the preparation of the oligoesters. Moreover, we will select the reactants giving oligoesters having a high solubility in usual organic solvents, a low melting temperature, a sufficiently high thermal stability and resistance to oxidation so that the ester linkages are not degraded at temperatures of 150°C or more.

Thus, the more convenient dicarboxylic compounds are the isophthalic and terephthalic acids and their lower alkyl esters (preferably methyl esters) as well as the 4,4'-biphenyl dicarboxylic and 4,4'-diphenylether dicarboxylic acids and their lower alkyl esters (preferably methyl). As diols, we will advantageously make use of neopentylglycol, ethyleneglycol, di-, tri- and tetra-ethylene glycols as well as 1,4-dimethylol benzene (or p-xyleneglycol).

When preparing the oligoesters of formula (4) by direct esterification of an aromatic dicarboxylic acid or of a mixture of several aromatic dicarboxylic acids by a diol or a mixture of diols, we generally proceed at a temperature from 120° to 300°C, optionally in the presence of a conventional esterification catalyst for shortening the reaction time. Among the catalysts we can mention for example: p-toluene-sulfonic acid, phosphoric acid, titanium alkoxides or dibutyl-tin oxide. The reactants may be admixed together and the mixture heated to the selected temperature until the reaction is complete, or the reactants may be admixed with an inert organic compound for dissolving them and/or dissolving the oligoesters. The reaction may also be conducted in the presence of an inert organic compound non-solvent for the oligoesters (such for example as benzene, toluene or xylene) used for the azeotropic removal of the formed water.

When carrying out a transesterification reaction between a diol and an alkyl ester (preferably a methyl ester) of a dicarboxylic aromatic acid, we generally proceed at a temperature from 120°C to 300°C, either by melting the reactants or in the presence of a solvent or of a poor solvent such as in the preceding case. The reaction may be catalyzed by usual transesterification catalysts and particularly by acetates, octoates, carbonates, oxides and alkoxides of such metals as sodium, lithium, zinc, calcium, magnesium, aluminum, titanium, lead, cobalt, manganese or antimony. The diol excess is then completely or partially removed either by washing or distillation, preferably under reduced pressure.

Irrespective of the esterification method to be used, we may proceed to the determination of the free hydroxy groups and to the measurement of the average molecular weight of the obtained oligoester composition before proceeding to the second reaction stage of the process.

This oligoester composition may be used directly in the second stage of the process, but it is also possible to esterify it previously for example by reaction with a monocarboxylic aliphatic anhydride acid, preferably acetic anhydride. In this case, the corresponding monocarboxylates (acetates) will be involved in the second step.

When manufacturing the polyamine compositions of the invention in three steps, the second step consists of reacting oligoesters of formula (4) produced in the first step, with a molar amount, substantially corresponding to the number of free hydroxy equivalents of said oligoesters, of at least one aromatic nitrocarboxylic compound of the general formula:

$$NO_2 - Ar - CO R'' \quad (5)$$

in which Ar is a divalent aromatic radical defined as above and R'' is a hydroxy lower alkoxy, cycloalkoxy or arylalkoxy group or a halogen atom (chlorine or bromine).

The reaction is conducted in such conditions that the formed product essentially consists of at least one nitrated oligoester of the general formula:

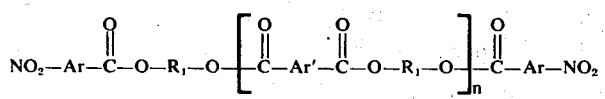

in which Ar, Ar', $R_1$ and $n$ are defined as above.

Among the compounds of formula (5) which can be used according to the invention, we can mention as examples: ortho, meta and paranitrobenzoic acids, 3-nitro 2-chloro-, 5-nitro 2-chloro- and 4-nitro 3-chloro-benzoic acids, o-toluic acids with a nitro group in position 3,4 or 5, m-toluic acids with a nitro group in position 4 or 5, p-toluic acids with a nitro group in position 2 or 3,4-methoxy 3-nitro benzoic acid, 4-phenoxy 3-nitro benzoic acid, 1-naphthoic acid with a nitro group in position 3, 4, 5 or 6, 2-naphthoic acid with a nitro group in position 5,6,7 or 8,3-phenoxybenzoic acid with a nitro group in position 2', 3' or 4', 4-phenoxy benzoic acid with a nitro group in position 2', 3' or 4', 3-biphenylcarboxylic and 4-biphenylcarboxylic acids with a nitro group in position 2', 3' or 4', 4 -carboxy 4'-nitrodiphenylsulfide, 4-carboxy 4'-nitrodiphenylsulfone, 4-carboxy 4'-nitro diphenylsulfoxide, 2-benzophenone carboxylic acids, 3-benzophenone carboxylic acids and 4-benzophenone carboxylic acids with a nitro group in position 2', 3' or 4', the 3'-nitro and 4'-nitro diphenylmethane 4-carboxylic acids or still dimethyl paranitrophenyl paracarboxyphenylsilane acid.

In most cases, we will make use of meta- and para-nitrobenzoic acids, as well as nitrophenoxybenzoic acids.

We may also use halides, preferably chlorides and esters such, for example, as the methyl, ethyl, propyl, isopropyl, butyl, cyclohexyl or phenyl esters of said acids.

When esterifying oligoesters of formula (4) with at least one nitrocarboxylic aromatic acid of formula (5) in which R' = OH, the reaction may be conducted without solvent or in the presence of a solvent of high boiling point such as aromatic hydrocarbons, chlorinated aromatic hydrocarbons or phenyl oxide, and at a temperature from 120° to 350°C. The reaction temperature depends on the esterification rate but must not be too high in order to limit as much as possible, the polycondensation reaction of the oligoesters (4) with themselves. For speeding up the reaction, we may add one or more compounds which are known as catalyzing reactions of this type, such for example as inorganic acids, sulfonic acids or titanium alkoxides.

When manufacturing nitrated oligoesters (6) by reacting oligoesters (4) with at least one nitro-carboxylic aromatic acid ester of formula (5) in which for example R''=OCH_3 OC_2H_5, OC_3H_7 or OC_6H_5, the transesterification reaction may be conducted at a temperature from 100° to 300°C with or without solvent, in the absence or in the presence of transesterification catalysts, with the removal of the formed alcohol and/or phenol.

When it is desired to obtain nitrated oligoesters (6) by reacting oligoesters of formula (4) with at least one halide (a chloride or a bromide) of nitro-carboxylic aromatic acid of formula (5) in which R'' = Cl or Br, the reaction may be conducted without solvent at room temperature or at a higher temperature, preferably from 80° to 200°C. It may also be conducted in the presence of the inert organic compound capable of dissolving one of the reactants and/or the reaction products. Among the solvents which can be used, we may mention the aromatic hydrocarbons such as benzene, toluene or xylenes (optionally with addition of bases such as pyridine or triethylamine in order to capture the hydracic evolved during the reaction), the chlorinated aromatic hydrocarbons, nitrobenzene, pyridine quinoline, methylpyridines, dimethylformamide, dimethylacetamide, N-methylpyrrolidone or tetramethylenesulfone. In the case where the oligoesters of formula (4) have been preliminarily converted by reaction with an aliphatic monocarboxylic acid anhydride, preferably acetic anhydride, for manufacturing the corresponding carboxylates (for example the acetates of the general formula:

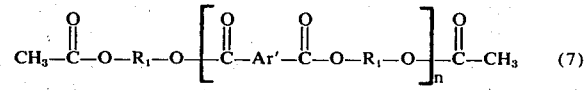

in which Ar', $R_1$ and $n$ are defined as precedingly) we conduct the second stage by subsequently reacting said carboxylates with at least one nitro-carboxylic aromatic acid or one of its lower alkyl esters (formula 5 in which R''=OH or —OCH_3, OC_2 H_5, etc . . . ) in a molar proportion corresponding substantially to the number of reactive carboxylate groups. This transacidolysis reaction is generally conducted at a temperature from 125° to 350°C, with or without solvent and in the presence or the absence of catalysts. It is terminated when the theoretical amount of monocarboxylic acid (for example acetic acid) or of lower alkyl carboxylates (for example acetates) has been removed by distillation.

The nitrated oligoester compositions of formula (6) are subsequently converted, in a third stage, to polyamine compositions according to the invention, by hydrogenating the "nitro" groups to amine groups by means of any of the processes known for carrying out this reaction. We can mention for example the catalytic hydrogenation in the presence of nickel, palladium or platinum, the hydrogenation by metal hydrides, the hydrogenation by metals in acid or basic medium, the hydrogenation by stannous chloride, sodium hydrosulfide or ammonium polysulfide.

The polyamine compositions of the invention may finally be prepared in two stages by directly reacting in the second stage oligoesters of formula (4) obtained at the end of the first stage with at least one amino-carboxylic compound of the general formula:

$$NH_2 - Ar - COR''' \quad (8)$$

in which Ar is a divalent aromatic radical defined as above and R''' is a hydroxy group or a lower alkoxy radical such for example as $OCH_3$, $OC_2H_5$ or $OC_3H_7$.

Among the compounds of formula 8, we can mention as examples: the ortho, meta and para-aminobenzoic acids, the aminotoluic acids, the aminonaphthoic acids and the methyl and ethyl esters of said acids. In most cases we will make use of paraaminobenzoic acid or its methyl or ethyl ester.

The polyamine compositions according to the invention are in the form of solids or of resinous compositions having melting temperatures from −10° to 250°C. They have a good resistance to atmospheric oxidation, an excellent compatibility with most of epoxy resins and a high solubility in many organic solvents, particularly in aliphatic and alicyclic ketones which are very suitable solents for epoxy resins.

The epoxy resins which may be hardened by polyamine compositions according to the invention consist of compounds having more than one epoxy group per molecule. We can mention, as examples of such resins: the epoxidated unsaturated hydrocarbons such as butadiene dioxide, vinylcyclohexenedioxide, dicyclopentanedienedioxide or dipentenedioxide; the epoxidated dienic polymers such as epoxidated polybutadiene; the glycidic ethers or aliphatic polyols such as the diglycidylethers of propanediol, butanediol, ethyleneglycol or neopentylglycol, or the triglycidylether of glycerol; the glycidic ethers of polyphenols such as the diglycidylethers of resorcinol, hydroquinone, pyrocatechol, methylresorcinol, 2,2-bis-(4 hydroxyphenyl) propane, 2,2-bis(4-hydroxy 3,5-dibromo phenyl) propane, 2,2-bis-(4-hydroxy 3,5-dichlorophenyl)propane, 4,4'-dihydroxy benzophenone, 4,4'-dihydroxy biphenyl, bis-(4-hydroxy phenyl)ethane, 1,5-dihydroxynaphthalene, bix-(4-hydroxy phenyl) sulfone, bis-(4-hydroxy phenyl)methane, the triglycidyl-ethers of trihydroxy biphenyles, 1,1,3-tris-hydroxyphenyl propane, p-aminophenol or phosphate of bis-phenol-A or the tetraglycidylethers of bis-resorcinol F or 1,1,2,2-tetrakis (p-hydroxyphenyl) ethane, the polyglycidylethers of "novolacs" obtained by condensation of an aldehyde with a phenol; the glycidic esters of aliphatic, alicyclic or aromatic carboxylic acids such as glycidyl adipate, phthalate, tetrahydrophthalate, isophthalate, terephthalate, trimesate, trimellitate, maleate or pyromellitate and the ethers and esters of cycloaliphatic epoxy resins such as bis-(2,3-epoxy cyclopentyl) ether, epoxydicyclopentylphenyl-glycidyl ether, bis-(3,4-epoxy-6-methyl-cyclohexyl methyl) adipate, 3,4-epoxy cyclohexyl methyl ester of 3,4-epoxy cyclohexane carboxylic acid or 3,4-epoxy-6-methyl cyclohexylmethyl ester of 3,4-epoxy-6-methyl-cyclohexane carboxylic acid.

In order to prepare resinous compositions, we can use, for example, from 0.5 to 2 equivalents of active hydrogen of an amine per epoxide equivalent, the best results being obtained when this proportion is from 0.75 to 1.3 hydrogen equivalents. (Similarly as the epoxide equivalent weight is the weight of the epoxy resin, expressed in grams, which contains an epoxide group, it is meant by NH or hydrogen equivalent weight, the amount in grams of aromatic polyamine containing one hydrogen gram-atom fixed on the nitrogen atom of the amine function). For obtaining hardened products having optimal properties, it is important that the epoxy resins and the hardening agent be admixed as intimately as possible. When the reactants are in the solid state, they can be admixed in a crusher or melted together or still dissolved in a common solvent. When the resin is liquid, it can be used as solvent for the hardening agent.

For the polyamine compositions according to the invention, we can also add compounds known for speeding up the cross-linking reaction, such as boron trifluoride, phenols, dimethyl-aminomethyl phenol, inorganic or organic acids in amounts varying from 0.05 to 5 % by weight with respect to the other reactants. We can also add more or less significant proportions of conventional aromatic diamines, plasticizers, inorganic fillers, reactive or non reactive diluents, other polymers such as polyesters, polyamides, polyvinylacetals or elastomers, inasmuch as these different products may contribute to improvements for specific applications.

The invention will be described more in detail in the following specific examples, the details of which are given by way of illustration and are not limitative of the scope of the invention. In these examples, the term "hydroxy number" is used for indicating the number of hydroxy groups in 100 g of oligoester, the term "hydroxy equivalent weight" is used for indicating the weight in grams of oligoesters corresponding to a hydroxy gram-equivalent, the term "amine number" is used for indicating the number of $NH_2$ equivalents in 100 g of polyamine and the term "amine equivalent weight" is used for indicating the weight in grams of polyamine corresponding to one $NH_2$ gram-equivalent.

Examples 1 to 13 illustrate the manufacture of oligoesters of formula (4) and example 14 the acetylation of such oligoesters. Examples 15 to 36 illustrate the synthesis of polyamine compositions of formula (1) and examples 37 to 60 describe the preparation and use of resinous compositions obtained from epoxy resins and polyamine compositions of the invention. Example 41 is given by way of comparison.

EXAMPLE 1

In a reactor of 5 liters capacity equipped with a stirrer, a small Vigreux distillation column and a nitrogen inlet, we introduce 800 g of methyl isophthalate, 1 600g of neopentylglycol and 5 g of litharge: We heat the mixture to 190°–195°C for 2 hours. At the end of the reaction, the removal of the formed methanol is favored by a partial vacuum of 20 to 50 mm of mercury and we cool to 100°–110°C. The neopentylglycol excess is removed by several washings with hot water and the resulting product is dried at 80° − 100°C under reduced pressure. The oligoester mixture, amounting to 1 340 g is a vitrous composition having an average molecular weight from 370 to 380 and a hydroxy number of 0.54 hydroxy group per 100 g, corresponding to a hydroxy equivalent weight of 185 g.

EXAMPLES 2 to 10

By using the experimental conditions of example 1, and the amount of reactants indicated in table I, we prepare a series of oligoesters whose average molecular weight (AMW), hydroxy number (OH.N) and hydroxy equivalent (OH. E.W.) are given in the same table.

TABLE I

| Ex. No | Reactants | Weight of reactants (g) | AMW | Oligoesters OH.N | OH.E.W |
|---|---|---|---|---|---|
| 2 | Methyl terephthalate<br>Neopentylglycol | 1 000<br>2 000 | 400 | 0.52 | 192 |
| 3 | Methyl terephthalate<br>Methyl isophthalate<br>Neopentylglycol | 194<br>194<br>1 000 | 390 | 0.54 | 185 |
| 4 | Methyl isophthalate<br>Ethyleneglycol | 100<br>400 | 255 | 0.8 | 125 |
| 5 | Methyl terephthalate<br>Ethyleneglycol | 100<br>400 | 260 | 0.8 | 125 |
| 6 | Methyl terephthalate<br>Diethyleneglycol | 100<br>300 | 410 | 0.5 | 200 |
| 7 | Methyl terephthalate<br>Tetraethyleneglycol | 100<br>600 | 550 | 0.45 | 223 |
| 8 | Methyl terephthalate<br>p-xylyleneglycol | 50<br>250 | 410 | 0.495 | 202 |
| 9 | Methyl 4,4'biphenyldicarboxylate<br>Neopentylglycol | 50<br>150 | 455 | 0.445 | 225 |
| 10 | Methyl 4,4'diphenyletherdicarboxylate<br>Neopentylglycol | 50<br>100 | 460 | 0.45 | 223 |

EXAMPLE 11

The transesterification reaction is conducted as in example 1 with 100 g of methyl isophthalate, 500g of neopentyglycol and 0.5 g of litharge at 200°C. At the end of the reaction, the glycol excess is removed by distillation at 200°C. The residue is a mixture of oligoesters having an average molecular weight of 1 130, and formed essentially of oligoesters whose polycondensation degree is from 3 to 6. The hydroxy number of this mixture is 0.175 (OH.E.W = 570 g).

EXAMPLE 12

In a flask of a 250 ml capacity equipped as in example 1, we introduce 58.2 g of methyl isophthalate, 46.8 g of neopentylglycol, 0.2 g of litharge and 50 ml of xylene. The flask content is heated to 180°C until the theoretical amount of methanol has been distilled off. Subsequently, xylene is distilled by heating to 200°C. We obtain a mixture of oligoesters whose average molecular weight is 690 (consisting essentially of oligoesters having a polycondensation degree from 1 to 3), and a hydroxy number of 0.286 (OH.E.W = 380 g).

EXAMPLE 13

While making use of the experimental conditions of example 12, we react, at a temperature from 180° to 210°C, an amount of 116.4 g of methyl terephthalate and 50 g of ethyleneglycol in the presence of litharge and 50 ml of xylene, so as to obtain a mixture of oligoesters having an average molecular weight of 640 and a hydroxy number of 0.31 (OH.E.W = 322 g).

EXAMPLES 14

In a reactor of a 0.5 liter capacity, we introduce 192 g of oligoesters prepared as in example 2, 112 g of acetic anhydride and 10 ml of pyridine. We heat the mixture to 150°C until complete acetylation of the hydroxy functions. The reaction lasts 3 hours. The mixture is then washed with a 10% aqueous solution of sodium carbonate, then with a sulfuric acid solution at a 5 % concentration and finally with water, up to neutrality. The product is dried at 120°-130°C. The obtained acetate has an average molecular weight of 450 and its infra-red spectrum no longer shows absorption in the area of valency vibrations of alcohol hydroxy groups.

EXAMPLE 15

In a flask of a 0.5 liter capacity, equipped with a Vigreux distillation column and a nitrogen inlet, we introduce 192 g of oligoesters of example 2, 181 g of methyl p-nitrobenzoate and 0.5 g of litharge. We heat this mixture to 180°-200°C until the theoretical amount of methanol has been distilled off. The reaction continues over 5 hours. The resulting product has an average molecular weight of 674. It is hydrogenated in 1.5 liter of ethyl acetate in the presence of 15 g of palladium deposited on carbon at a concentration of 5 %, under a hydrogen pressure of 5 bars. At the end of the reaction, the catalyst is removed by filtration and the solvent distilled off under reduced pressure. We otain 280 g of polyamine having an average molecular weight of 630 and an amine number of 0.325, i.e. an amine equivalent weight of 308 g. The melting temperature of said composition is 74°-80°C.

EXAMPLE 16

We dissolve 125 g of the oligoester of example 5 into into 0.8 liter of pyridine and, while stirring, we add, in about 30 minutes, 185 g of meta-nitrobenzoyl chloride. The mixture is heated for 1 hour at 100°C and the major part of pyridine is then distilled under reduced pressure. The residue is poured into 1.5 liter of an aqueous solution of diluted hydrochloric acid. The oil which decants is washed with water up to neutrality and dried (yield 250 g). The resulting nitrated compound is hydrogenated as in example 15. The resulting polyamine composition is characterized by AMW = 515, $HN_2N = 0.405$, $NH_2.E.W = 247$ g ($NH_2.N$ is the amine number and $NH_2.E.W$ is the $NH_2$ equivalent weight.

EXAMPLE 17

Into a reactor of a 2 liter capacity equipped with a stirrer and an adding funnel, we introduce 185 g of p-nitrobenzoyl chloride and 0.8 liter of toluene. This mixture is cooled at a temperature from 0° to −10°C and we add progressively through the adding funnel, a solution of 185 g of oligoesters of example 1 in 0.2 liter of benzene and 80 g of pyridine. The reaction is performed in one night at room temperature. The reaction mixture is washed successively with water, with a solution of diluted sulfuric acid, with a solution of sodium carbonate at a 10 % concentration and with water up to neutrality. After evaporation of the organic solvents, the residue is hydrogenated in a dioxane-ethanol mixture as indicated in example 15. We obtain a polyamine of an average molecular weight of 608 having an amine equivalent weight of 300 g and a melting temperature of 55°C.

EXAMPLE 18

In a flask of a capacity of 0.1 liter, equipped with a small Vigreux column, and a nitrogen inlet, we introduce 23 g of the acetate mixture of example 14, 26 g of paranitrophenoxy benzoic acid, 0.25 g of sodium acetate and 0.5 g of triphenyl phosphite. This mixture is heated to 270°–280°C until the theoretical amount of acetic acids has been distilled off. The residue is dissolved in 300 ml of ethyl acetate and hydrogenated as in example 15. The characteristics of the resulting polyamine are as follows: AMW = 800, $NH_2.N$ = 0.258, $NH_2.E.W.$ = 388 g.

EXAMPLE 19

We heat to reflux the mixture of 32 g of oligoesters of example 1, 20 g of para-nitrobenzoic acid, 0.25 g of para-toluenesulfonic acid and 50 ml of xylene. The water vapor evolved during the esterification reaction is condensed in a Dean and Stark separator while xylene is fed back to the reaction flask. At the end of the reaction, xylene is distilled under reduced pressure and the residue is washed with a solution of sodium carbonate; then with water up to neutrality. After drying, the nitrated compound is hydrogenated in dimethylformamide. The resulting polyamine composition has an average molecular weight of 940 and an amine equivalent weight of 460 g ($NH_2.N$ = 0.217).

EXAMPLE 20

We heat to reflux a mixture of ethyl para-aminobenzoate (16.2 g), oligoester of example 2 (19.2 g), sodium ethylate (0.2 g) and xylene (100 ml), ethanol being progressively distilled as it is formed. The reaction is terminated after 10 hours of heating and the resulting residue, after evapoation of xylene, is washed with water and dried. The obtained polyamine composition has the following characteristics: AMW = 618, amine equivalent weight = 325 g, $NH_2N$ = 0.308.

EXAMPLES 21 to 36

According to the method described in examples 15–20, we prepare polyamine compositions whose characteristics are indicated in the following table II:

TABLE II

| Ex. No. | Oligo-esters of Ex. No. | Nitrobenzoic acid substituted in position | Method of Ex. No. | Polyamines M | $'NH_2$ | $P.E.NH_2$ |
|---|---|---|---|---|---|---|
| 21 | 1 | meta | 15 | 620 | 0.333 | 300 |
| 22 | 2 | meta | 17 | 600 | 0.34 | 295 |
| 23 | 3 | para | 17 | 590 | 0.345 | 290 |
| 24 | 4 | para | 15 | 550 | 0.392 | 255 |
| 25 | 4 | meta | 20 | 520 | 0.385 | 260 |
| 26 | 5 | para | 16 | 540 | 0.382 | 262 |
| 27 | 6 | para | 15 | 628 | 0.328 | 306 |
| 28 | 7 | para | 17 | 790 | 0.263 | 380 |
| 29 | 8 | para | 15 | 700 | 0.302 | 332 |
| 30 | 8 | meta | 17 | 680 | 0.315 | 318 |
| 31 | 9 | para | 16 | 670 | 0.313 | 320 |
| 32 | 10 | para | 17 | 700 | 0.302 | 332 |
| 33 | 11 | meta | 16 | 1390 | 0.147 | 680 |
| 34 | 11 | para | 16 | 1400 | 0.146 | 683 |
| 35 | 12 | meta | 16 | 960 | 0.218 | 458 |
| 36 | 12 | para | 16 | 970 | 0.215 | 465 |

EXAMPLE 37

In this example, we determine the viscosity variation of a resinous composition versus temperature by use of a rheometer whose measuring cup is charged with a mixture of 46 g of "Epikote 828" resin of Shell Chimie and 42 g of polyamine of example 15. The temperature of the mixture 60°C : 3 800 cp; 65°C : 1 400 cp; 70°C : 750cp; 75°C:460 cp; 80°C: 340cp; 90°C: 200cp; 100°C: 120cp; 110°C : 80 cp For certain applications, such as molded articles, varnishes, composite materials without solvent, which require a viscosity lower than 500 cp, it is apparent that the operating temperatures must be higher than 75°C.

EXAMPLE 38

At a determined temperature, the viscosity variation versus time makes it possible to appreciate the life time in pot of the resinous composition and gives an approximate value of the gel time. This measurement is performed by means of a rheometer whose cup is filled with a mixture of 10 g of "Epikote 828" resin and 9 g of the polyamine of example 15. The following table III indicates some of the values obtained at 100°C, 125°C, 150°C and 170°C.

TABLE III

| Temperature (°C) | Times in minutes for reaching a viscosity in cp of | | | | | |
|---|---|---|---|---|---|---|
| | 100 | 200 | 500 | 1 000 | 5 000 | 50 000 |
| 100 | — | — | 150 | 240 | 380 | 500 |
| 125 | 60 | 90 | 95 | 135 | 180 | 215 |
| 150 | — | 60 | 75 | 80 | 95 | 105 |

TABLE III-continued

| Temperature (°C) | Times in minutes for reaching a viscosity in cp of | | | | | |
|---|---|---|---|---|---|---|
| | 100 | 200 | 500 | 1 000 | 5 000 | 50 000 |
| 170 | 30 | 40 | 44 | 47 | 55 | 60 |

TABLE V

| Example No. | Epoxy resin | Polyamine of Exam. No. | weight (g) | Bending temperature(°C) |
|---|---|---|---|---|
| 42 | "Epikote 828" | 19 | 25 | 98 |
| 43 | " | 24 | 13 | 102 |
| 44 | " | 26 | 14 | 112 |
| 45 | " | 27 | 16.5 | 92 |
| 46 | " | 28 | 20 | 85 |
| 47 | " | 31 | 16.5 | 158 |
| 48 | " | 32 | 17 | 112 |
| 49 | "Epikote 154" | 16 | 13 | 125 |
| 50 | " | 17 | 15 | 146 |
| 51 | " | 18 | 23 | 160 |
| 52 | " | 21 | 15 | 140 |
| 53 | " | 22 | 15 | 165 |
| 54 | " | 29 | 17 | 159 |

EXAMPLE 39

At a temperature of 120°C, we admix 38.5 g of "Epikote 828" resin and 30.4 g of the polyamine of example 15. The limpid and homogenous solution is degassed under vacuum and then cast in a mold. The hardening of the resin is performed in 5 hours at 125°C, 5 hours at 150°C and 5 hours at 200°C. Some of the properties of the resulting material are indicated in table 4.

EXAMPLE 40

We manufacture as in example 39, a molded material with 35 g of "Epikote 154" resin and 30.4 g of the polyamine of example 4. The characteristics of the product are indicated in table IV.

EXAMPLE 41

By way of comparison, we manufacture, in the same conditions, materials containing 38.5 g of "Epikote 828" resin and 14 g of di-(4-amino phenyl) sulfone (41-a) and 30 g of "Epikote 154" and 10 g of di-(4-amino phenyl) sulfone (41-b).

TABLE IV

| Resin of Ex. No. | Specific gravity (g/cc) | Bending temperature(1) (°C) | Tensile stress(2) (kg/mm²) | Traction modulus (kg/mm²) | Lenghthening at break (%) |
|---|---|---|---|---|---|
| 39 | 1.17 | 140 | 8 | 246 | 15 |
| 40 | 1.19 | 170 | 6 | 250 | 6 |
| 41-a | 1.23 | 170 | 6 | 322 | 5 |
| 41-b | 1.25 | 210 | 5.6 | 360 | 4 |

(1) Bending temperature under a load according to Standard ASTM D 648-56
(2) traction breaking stress.

EXAMPLES 42 to 54

We prepare compositions with 20 g of "Epikote 828" epoxide resin or 18 g of "Epikote 154" resin and the polyamine amount indicated in table V. These compositions, heated to 150°C, are casted in molds of polytetrafluorethylene, standardized for the measurement of deflection temperatures under load according to standard ASTM D 648-56. The compositions are degassed under vacuum for 30 minutes at 125°C and the hardening is performed in 5 hours at each of the temperatures of 125°, 150° and 200°C. The different values of the bending temperatures under load are indicated in table V.

EXAMPLE 55

We dissolve 9 g of the polyamine of example 15 into 9.6 g of "Epikote 828" resin heated to 120°C. With this mixture we impregnate a piece of 20 × 40 cm of glass fabric E-181 treated with a finish of α - aminopropyltriethoxysilane. After cooling the impregnated fabric is cut in 4 identical elements which are kept in polyethylene bags.

These elements are used for manufacturing laminates after 3, 6, 9 or 12 months of storage at room temperature. The resinous composition shows no tendency to spontaneous hardening or ageing and it can be used easily after one year of storage.

EXAMPLE 56

As in example 55, we make use of a mixture of 40 g of "Epikote 828" resin and 36 g of the polyamine of example 15 for impregnating a strip of glass fabric of 20 × 160 cm. The fabric is then heated to 150°C for 75 minutes for prepolymerizing the resin. It is then cut out in eight elements of 20 × 20 cm which are superimposed and placed between the plates of a hydraulic press heated to 170°C. A contact pressure is applied for 3 minutes and then a pressure of 15 bars for 10 minutes at this temperature and 2 hours at 200°C. The material is then reheated in a stove with forced ventilation for 4 hours at 200°C. It contains 22% of resin and 78% of glass; it has a specific gravity of 2 and an apparent porosity of 0.8%.

EXAMPLE 57

Into 60 ml of methyleneglycol, we dissolve the respective amounts of reactants indicated in example 56 and we impregnate the glass fabric at 25°C with this solution. After drying at 25°C for 2 hours and at 150°C for 2 hours, the impregnated fabric is used under the same conditions for manufacturing a laminate having a density of 1.98, an apparent viscosity of 0% and a resin content of 27% for a glass content of 73%.

EXAMPLE 58

We make use of 36 g of "Epikote 154" resin and 36 g of the polyamine of example 15 for manufacturing without solvent a laminate as described in example 56. After pressing, the fabric is heated to 150°C for 40 minutes. The resulting material contains 40% of resin and 60% of glass. It has a specific gravity of 1.76 and an apparent porosity of 0.2%.

EXAMPLE 59

We dissolve 18 g of "Epikote 154" resin and 18 g of the polyamine of example 15 into 35 ml of methylethylketone and we make use of this solution for impregnating a strip of glass fabric of 20 × 80 cm. After drying for 2 hours at 150°C, we manufacture a laminate in the same conditions as in example 56. It contains 22% of resin and 78% of glass. Its specific gravity is 1.99 and its apparent porosity is 3%.

EXAMPLE 60

We make use of a solution of 19 g of "Epikote 154" resin and 18 g of the polyamine of example 21 in 50 ml of acetone for manufacturing a composite material as in example 59. This material contains 21% of resin, has a specific gravity of 2.07 and an apparent porosity of 2%.

The composite materials prepared according to examples 56 to 60 are cut in samples for flexural tests. These samples are aged at 150°C and 200°C in the air in a stove under forced ventilation.

The values of the flexural modulus ($M_o$), of the flexural stress at break (FSB) and of the material weight loss after ageing, are indicated in the following table VI.

In the above examples, the names "Epikote 828" and "Epikote 154" are trade marks.

We claim:

1. A composition consisting essentially of at least one aromatic polyamine of the general formula:

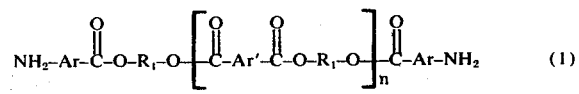

(1)

in which Ar is an aromatic divalent radical, said radical being unsubstituted benzene or benzene substituted by halogen or alkyl, or two fused benzene rings, or two benzene rings bonded by a single bond or by:

—O—; —S—; —SO—; —SO$_2$—; —CO—;

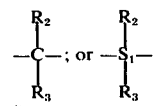

in which $R_2$ and $R_3$ are hydrogen atoms or monovalent hydrocarbon radicals; and in which Ar' is an aromatic divalent radical having two valences on separate carbon atoms and being a single benzene ring, or pyridine, or two fused benzene rings, or two benzene rings joined by a single bond or by —O—; —CO—; or

in which $R_2$ and $R_3$ are hydrogen atoms or monovalent hydrocarbon radicals; each radical $R_1$ is selected from the divalent saturated aliphatic, saturated alicyclic, aliphatic alicyclic and arylaliphatic hydrocarbon radicals having from 2 to 24 carbon atoms and from the divalent radicals of the formula:

—(—R$_4$—O—)—$_m$R$_4$,

TABLE VI

| Material of Example No. | Ageing conditions | | Flexural properties in kg/cm² as measured | | | | | | Weight loss (%) |
|---|---|---|---|---|---|---|---|---|---|
| | hours | temp(°C) | at 25°C | | at 125°C | | at 150°C | | |
| | | | FSB | $M_o$ | FSB | $M_o$ | FSB | $M_o$ | |
| | 0 | | 57 | 2475 | 35 | 1770 | 18 | 1350 | |
| | 1 000 | 150 | 58 | 2500 | 37 | 1850 | | | 0.23 |
| 56 | 2 000 | 150 | 58 | 2600 | 39 | 1900 | 21 | 1750 | 0.3 |
| | 4 000 | 150 | 56 | 2500 | 38 | 1870 | 24 | 1780 | 0.5 |
| | 2 000 | 200 | 52 | 2640 | | | 27 | 1990 | 0.73 |
| | 0 | | 64 | 2560 | 32 | 1660 | 15 | 1200 | |
| 57 | 2 000 | 150 | 46 | 2435 | 35 | 1790 | 22 | 1440 | |
| | 2 000 | 200 | 42 | 2520 | | | 25 | 1700 | |
| | 0 | | 52 | 1980 | | | 38 | 1610 | |
| | 1 000 | 150 | 52 | 1950 | | | 38 | 1670 | 0.15 |
| 58 | 2 000 | 150 | 50 | 1990 | | | 43 | 1780 | 0.3 |
| | 4 000 | 150 | 49 | 2000 | | | 40 | 1810 | 0.45 |
| | 2 000 | 200 | 45 | 2000 | | | 35 | 1790 | 0.9 |
| | 0 | | 61 | 2850 | | | 38 | 2420 | |
| 59 | 2 000 | 150 | 63 | 2885 | | | 42 | 2525 | 0.10 |
| | 2 000 | 200 | 55 | 2900 | | | 40 | 2580 | 0.50 |
| | 0 | | 60 | 2840 | | | 20 | 1640 | |
| | 1 000 | 150 | 58 | 2780 | | | 27 | 1995 | 0.5 |
| 60 | 2 000 | 150 | 57 | 2770 | | | 33 | 2250 | 0.8 |
| | 4 000 | 150 | 57 | 2810 | | | 32 | 2300 | 1.2 |
| | 2 000 | 200 | 53 | 2790 | | | 36 | 2320 | 3.5 | in which $R_4$ is a divalent saturated aliphatic radical having from 2 to 10 carbon atoms, $m$ is an integer from 1 to 100 and $n$ is an integer from 1 to 10.

2. A composition according to claim 1, in which the value of $n$ is from 1 to 6.

3. A composition according to claim 1, further comprising at least one polyamine with a branched oligoester chain.

4. A process for manufacturing a composition according to claim 1, comprising: a first step of reacting under usual esterification or transesterification conditions, at least one aromatic dicarboxylic compound of the general formula R'CO—Ar'—COR', in which Ar' is defined as in claim 1 and R' is selected from a hydroxy group, chlorine and bromine and lower alkoxy radicals, with an excess of at least one diol of the general formula HO—$R_1$—OH, in which $R_1$ is defined as in claim 1, thereby forming a composition consisting essentially of an oligoester of the general formula:

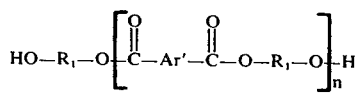

in which $n$ is defined as in claim 1, a second step of reacting said oligoester with at least one monocarboxylic aliphatic acid anhydride in order to form the corresponding carboxylate composition, a third step of reacting, under usual esterification or transesterification conditions, the composition obtained at the end of the second step with a molar amount, corresponding substantially to the number of reactive carboxylate equivalents of said composition, of at least one aromatic nitro-carboxylic compound of the general formula:

in which Ar is defined as in claim 1 and R" is selected from the hydroxy group and lower alkyl radicals, thereby forming a composition consisting essentially of at least one nitrated oligoester of the general formula:

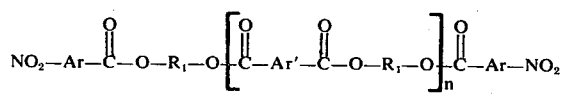

and a fourth step in which the nitrated oligoester composition obtained at the end of the third step is hydrogenated to a composition accordng to claim 1.

5. A process for manufacturing a composition according to claim 1, comprising a first step of reacting, under usual esterification or transesterification conditions, at least one aromatic dicarboxylic compound of the general formula R'CO— Ar'— COR', in which Ar' is defined as in claim 1 and R' is selected among hydroxy group, chlorine and bromine atoms and lower alkoxy radicals with an excess of at least one diol of the general formula HO — $R_1$— OH, in which $R_1$ is defined as in claim 1, thereby forming a composition consisting essentially of at least one oligoester of the general formula:

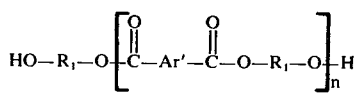

in which $n$ is defined as in claim 1, and a second step of reacting, under usual esterification or transesterification conditions, the composition obtained at the end of the first step with a molar amount, substantially corresponding to the number of free hydroxy equivalents of said composition, of at least one aromatic aminocarboxy compound of the general formula $NH_2$— Ar — COR''', in which Ar is defined as in claim 1 and R''' is selected from hydroxy group and lower alkoxy radicals, so as to form a polyamine composition according to claim 1.

6. A process according claim 4, in which the aromatic dicarboxylic compound is selected from the isophthalic and terephthalic acids, 4,4'-dicarboxylic biphenyle, 4,4'-dicarboxy diphenylether and their lower alkyl esters.

7. A process according to claim 4, in whch the diol is selected from neopentylglycol, ethyleneglycol, di-, tri- and tetraethyleneglycols and 1,4-dimethylol benzene.

8. A process according to claim 5, in which the aromatic amino-carboxylic compound is selected from p.aminobenzoic acid and its lower alkyl esters.

9. A process according to claim 4, in the first step of which the diol is used in an amount of 1.1 to 10 moles per mole of dicarboxylic compound.

10. A process according to claim 4, in the first step of which a small proportion of the reactants, dicarboxylic compounds, diols and mixtures thereof, is replaced by reactants, polycarboxylic compounds, diols and mixtures thereof of a functionality higher than 2, so as to form a composition according to claim 3.

11. A composition according to claim 1 wherein Ar' is 1,3-phenylene, 1,4-phenylene, a divalent biphenyl radical, or a divalent radical of diphenyl ether.

12. A composition according to claim 1 wherein $R_1$ is a divalent radical derived from neopentylglycol, ethylene glycol, diethylene glycol, triethylene glycol, tetraethylene glycol, or 1,4-dimethylol benzene.

13. A composition according to claim 1 wherein Ar is 1,3-phenylene, 1,4-phenylene or a divalent radical of diphenyl ether.

* * * * *

UNITED STATES PATENT AND TRADEMARK OFFICE
CERTIFICATE OF CORRECTION

PATENT NO. : 3,968,085
DATED : July 6, 1976
INVENTOR(S) : RABILLOUD ET AL

It is certified that error appears in the above–identified patent and that said Letters Patent are hereby corrected as shown below:

[73] Assignee: show read -- INSTITUT FRANCAIS DU PETROLE--.

Signed and Sealed this

Twenty-fifth Day of January 1977

[SEAL]

Attest:

RUTH C. MASON
*Attesting Officer*

C. MARSHALL DANN
*Commissioner of Patents and Trademarks*